United States Patent
Radatti et al.

(10) Patent No.: US 7,879,380 B1
(45) Date of Patent: Feb. 1, 2011

(54) APPARATUS, METHODS AND ARTICLES OF MANUFACTURE FOR HIGH CONDUCTIVITY COOKING

(75) Inventors: Marie D. Radatti, Conshohocken, PA (US); Peter V. Radatti, Conshohocken, PA (US)

(73) Assignee: Cybersoft, Inc., Conshohocken, PA (US)

( * ) Notice: Subject to any disclaimer, the term of this patent is extended or adjusted under 35 U.S.C. 154(b) by 858 days.

(21) Appl. No.: 10/783,539

(22) Filed: Feb. 20, 2004

Related U.S. Application Data

(63) Continuation-in-part of application No. 10/691,162, filed on Oct. 22, 2003.

(51) Int. Cl.
 *A23P 1/10* (2006.01)
(52) U.S. Cl. .................. 426/505; 426/439; 426/523; 426/514; 99/354; 99/404; 99/427; 99/442
(58) Field of Classification Search ......... 426/438–440, 426/496–498, 505, 512, 516, 520, 523, 514; 99/403–418, 354, 427, 442
See application file for complete search history.

(56) References Cited

U.S. PATENT DOCUMENTS

| | | | | |
|---|---|---|---|---|
| 1,076,383 A * | 10/1913 | Mendez | ................ | 99/426 |
| 1,266,912 A * | 5/1918 | Bradbury | ................ | 99/441 |
| 1,596,652 A * | 8/1926 | Giovannetti | ................ | 426/275 |
| 1,638,673 A * | 8/1927 | Wilcox | ................ | 99/382 |
| 1,663,719 A * | 3/1928 | Morley | ................ | 426/549 |
| D77,875 S * | 3/1929 | Bedel | ................ | D7/674 |
| 1,957,133 A * | 5/1934 | Davis | ................ | 99/424 |
| 1,994,268 A * | 3/1935 | Bartels | ................ | 99/343 |
| 2,013,337 A * | 9/1935 | Bordas | ................ | 249/126 |
| 2,039,477 A * | 5/1936 | Edgar | ................ | 126/388.1 |
| 2,204,699 A * | 6/1940 | Robertson | ................ | 99/448 |
| 2,244,193 A * | 6/1941 | Guyon et al. | ................ | 426/523 |
| 2,323,623 A * | 7/1943 | Porter et al. | ................ | 99/403 |
| 2,740,349 A * | 4/1956 | De Gonia | ................ | 99/426 |
| 3,007,595 A * | 11/1961 | Remley | ................ | 220/4.22 |
| 3,161,156 A * | 12/1964 | Batista et al. | ................ | 249/120 |
| 3,236,196 A * | 2/1966 | Ibex | ................ | 426/439 |
| 3,613,553 A * | 10/1971 | Popeil | ................ | 99/426 |
| 3,727,875 A * | 4/1973 | Downing | ................ | 249/121 |
| 3,831,508 A * | 8/1974 | Wallard | ................ | 99/440 |
| 3,946,654 A * | 3/1976 | Janssen | ................ | 99/403 |
| 4,066,797 A * | 1/1978 | McNair | ................ | 426/307 |
| 4,090,438 A * | 5/1978 | Luna | ................ | 99/441 |
| 4,171,739 A * | 10/1979 | Yamato | ................ | 198/704 |
| 4,313,964 A * | 2/1982 | Dembecki | ................ | 426/138 |
| 4,535,688 A * | 8/1985 | Bentson | ................ | 99/353 |
| 4,617,860 A * | 10/1986 | Blaylock | ................ | 99/415 |
| 4,719,849 A * | 1/1988 | Cope et al. | ................ | 99/404 |
| 4,740,379 A * | 4/1988 | Noguchi et al. | ................ | 426/512 |
| 5,308,636 A * | 5/1994 | Tye et al. | ................ | 426/573 |
| 5,359,924 A * | 11/1994 | Roberts et al. | ................ | 99/416 |
| 5,465,654 A * | 11/1995 | Lampi et al. | ................ | 99/422 |
| 5,603,976 A * | 2/1997 | Share et al. | ................ | 426/574 |

(Continued)

*Primary Examiner*—Drew E Becker
(74) *Attorney, Agent, or Firm*—John F. A. Earley, III; Frank J. Bonini, Jr.; Harding, Earley, Follmer & Frailey, P.C.

(57) ABSTRACT

Apparatus, methods and articles of manufacture are provided for cooking. A shell, made of high temperature material is disclosed for use in a frying apparatus. Thus, conductive heating and so cooking occurs on the food contained within the shell.

21 Claims, 2 Drawing Sheets

U.S. PATENT DOCUMENTS

| | | | |
|---|---|---|---|
| 5,662,027 A * | 9/1997 | Neville et al. | 99/415 |
| 5,731,022 A * | 3/1998 | Cummins | 426/231 |
| 5,865,103 A * | 2/1999 | MacGeorge et al. | 99/413 |
| 5,988,048 A * | 11/1999 | Hunter et al. | 99/413 |
| 6,048,564 A * | 4/2000 | Young et al. | 426/573 |
| 6,453,801 B1 * | 9/2002 | Masel et al. | 99/330 |
| 6,508,166 B1 * | 1/2003 | Hennessey | 99/355 |
| 6,598,515 B1 * | 7/2003 | Bove' | 99/407 |
| D479,944 S * | 9/2003 | Hennessey | D7/352 |
| 7,021,202 B2 * | 4/2006 | Sizer | 99/415 |
| 7,090,269 B2 * | 8/2006 | Kelsey | 294/118 |
| 2002/0146494 A1 * | 10/2002 | Wilk et al. | 426/279 |
| 2006/0099324 A1 * | 5/2006 | Aurio et al. | 426/656 |
| 2006/0117963 A1 * | 6/2006 | Schneider et al. | 99/403 |

* cited by examiner

APPARATUS, METHODS AND ARTICLES OF MANUFACTURE FOR HIGH CONDUCTIVITY COOKING

CROSS-REFERENCE TO RELATED APPLICATIONS

This application is a continuation-in-part of co-pending U.S. Ser. No. 10/691,162, entitled "LOW CARBOHYDRATE, FUNCTIONAL-LIKE FOODS AND SYSTEMS INCORPORATING SAME," filed on Oct. 22, 2003, by Marie D. Radatti and Peter V. Radatti and assigned to CyberSoft, Inc., which disclosure is incorporated herein by reference.

FIELD OF THE INVENTION

The present invention is related to apparatus, methods and articles of manufacture for high conductivity cooking. More particularly, the present invention is related to apparatus, methods and articles of manufacture for high conductivity cooking using frying machinery.

BACKGROUND OF THE INVENTION

Cooking, or applying heat in order to prepare food for eating, uses three primary methods for applying heat. One method is conduction, which transfers heat from any matter to a second matter. A second method is radiation, which transfers heat without direct contact. A third method is convection which provides heat transfer through fluids.

Methods of cooking may use combinations of these types of heat application. For example, baking or roasting typically uses all three methods, with the majority of heat application occurring through radiation and convection. As another example, frying primarily works through conduction although a small amount of convection also occurs (the liquid contacts the matter to be cooked, transfers heat, cools and then is replaced by hot liquid.)

Each method is desirable for different reasons. Convection provides perhaps the most direct heating method, as the heating material, e.g. oil or fat in frying, is directly in contact with the food to be heated. Yet, each method may have drawbacks as well, e.g., frying foods through convection results in the food absorbing some amount of the oil or fat used.

Frying has become especially disfavored for health reasons. The triglycerides (melted fats or oils) used in frying are deemed less than healthful when consumed in any great quantities. For example, fried chicken, prior to frying, is breaded. The breading absorbs some oil or fat while the chicken is being fried and thus increases the caloric intake of the eater. Still, and despite these and other possible drawbacks, frying remains a cooking method of choice.

Frying is used, for example, in the manufacture of doughnuts. Large commercial fryers immerse dough wholly or partially and so cook doughnut shaped dough into doughnuts. Although it may be desired to attempt to produce doughnuts and other fried goods using other methods of cooking, to date it has been extremely difficult because of the large base of installed fryers. Replacing those machines with other types of cooking machines would be difficult, if not impossible.

Accordingly, it would be helpful to provide an improved method of cooking, with little or no modification to existing machinery.

SUMMARY OF THE INVENTION

The present invention provides apparatus, methods and articles of manufacture for cooking food. One or more devices usable in a frying arrangement are provided. Those devices provide conductive heat to food within the confines of an existing frying arrangement.

DETAILED DESCRIPTION OF THE PREFERRED EMBODIMENTS

Although methods of cooking dough, and more particularly, doughnuts are referred to below with regard to preferred embodiments, it should be noted that embodiments may be used with whatever food is desired. Thus highly conductive apparatus, methods and articles of manufacture may be used in a method of cooking in a frying process.

Figure 1:
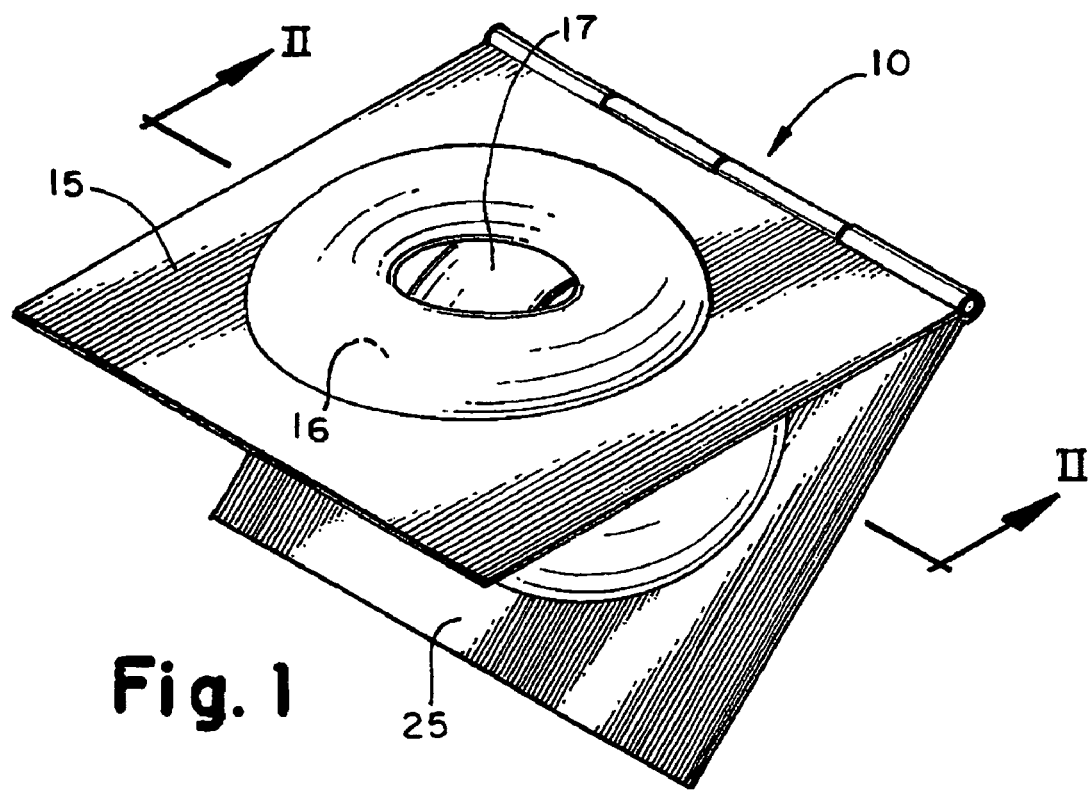
FIG. 1 shows a preferred embodiment.

FIG. 1 shows a preferred embodiment used in the manufacture of doughnuts. Shell 10 is comprised of a first plate 15 movably coupled to a second plate 25. The coupling is in the form of a hinge extending longitudinally here, however in other embodiments the coupling may be by any method known in the art.

Figure 2:
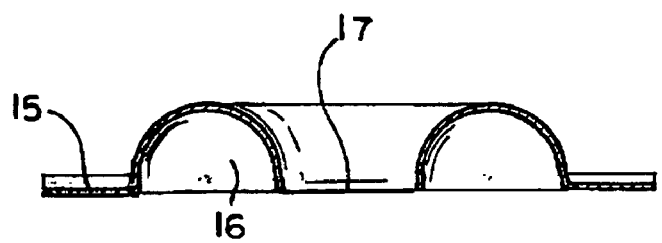
FIG. 2 shows another view, taken along line II-II of the embodiment of FIG. 1.

Turning to FIG. 2, a view along line II-II of FIG. 1 is seen. This shows first plate 15 in cutaway section. As can be seen, the general dispensation of groove 16 is semi-circular. Thus, dough may be placed within groove 16 for cooking, as is further described below with regard to this and other embodiments. Also shown is recess 17, which provides first plate 15 with a generally hollow center. Second plate 25 (not shown here) has a generally similar appearance.

Figure 3:
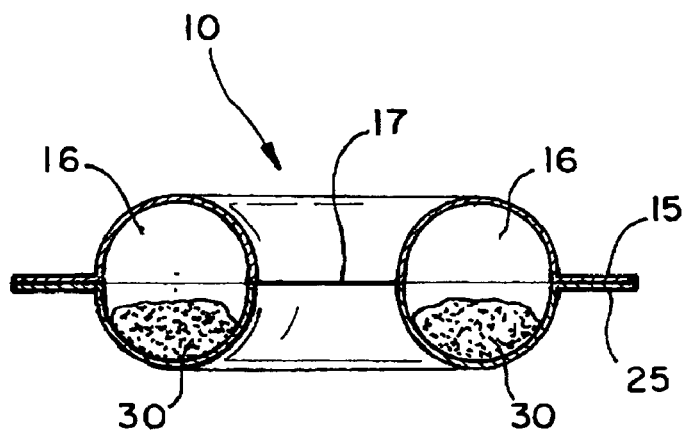
FIG. 3 shows another preferred embodiment.

Turning now to FIG. 3, shell 10 of FIG. 1 is seen closed. First plate 15 and second plate 25 are assembled in a generally mirrored fashion in order to provide symmetry to the final product, as is further described below with regard to this and other embodiments. Visible through the cutaway in shell 10 is dough 30. Dough 30 used in this embodiment has a formula as set forth below. Other doughs, as is further described below, may be used as well. It should be noted since various doughs to be used expand upon heating, as further described below, any dough that fills shell 10 is less than the amount required to fill the embodiment before cooking. Thus adequate space is provided for expansion upon heating.

Closure of shell 10 may be by any method known in the art, e.g., latches, seals, etc. so that the embodiment forms a generally liquid-tight seal about the dough. Plates 15 and 25 are constructed of high conductivity metal, such as copper or other materials. If constructed of copper or other materials that might potentially leach into the dough or oil, ("oil" is used here to encompass substances traditionally used in frying, e.g. oils, fats, shortenings, etc.,) plates 15 and 25 are also coated in order to prevent such leaching, e.g., with tin or other material. Further description of the materials used to construct this and other embodiments is set forth below.

It may be desired to construct shells in various embodiments so as to be heavy enough intrinsically or through additional weighting to displace oil, either by itself or with the addition of dough. Thus, immersion in various types of frying apparatus (which term as used herein includes those known in the art, e.g., deep fryers, commercial frying machinery, frying pans, etc.) may be accomplished as desired.

After dough 30 is placed inside shell 10 and shell 10 closed, the embodiment is ready for cooking. Cooking occurs through placement of the embodiment in a frying apparatus, such as a fryer as known in the art. The dough is cooked through conductive heat transmission: the heat of the fryer is conducted through shell 10 and thus to dough 30, which cooks dough 30. The weighting of shell 10, sufficient to sink it below the surface of the oil, provides further contact of shell 10 with the oil, and so conduction occurs throughout the embodiment. Of course in other embodiments, the shell may be weighted or unweighted so as to provide any desired degree of immersion.

Shell 10 may be turned or flipped during cooking as desired, for example at some predetermined time period. Turning or flipping may provide more even conductive heating as both sides of the dough will then be in direct contact with shell 10. Of course, dough 30 may expand rapidly enough after initial contact so that turning or flipping is not necessary, insofar as the desired conductivity will occur throughout the dough upon that expansion.

When the dough is cooked to the extent desired, shell 10 is removed from the oil, opened, and the now cooked doughnut removed.

As can be appreciated from the above description, use of the embodiment of FIGS. 1-3 and other preferred embodiments provides for high conductivity cooking in an existing frying apparatus. Moreover, the frying apparatus does not need to be altered, and maybe used in alternate fashion, that is, through alternating the production of conventional fried foods with foods cooked according to preferred embodiments.

The oil and machinery used is able to be cleaned and/or replaced less frequently than might otherwise be the case, that is, when used only for frying. The lengthening of the replacement cycle comes from the contact of shell 10 with the oil, rather than direct contact with dough. Thus there is less food and other contamination of the oil while cooking.

Figure 4:
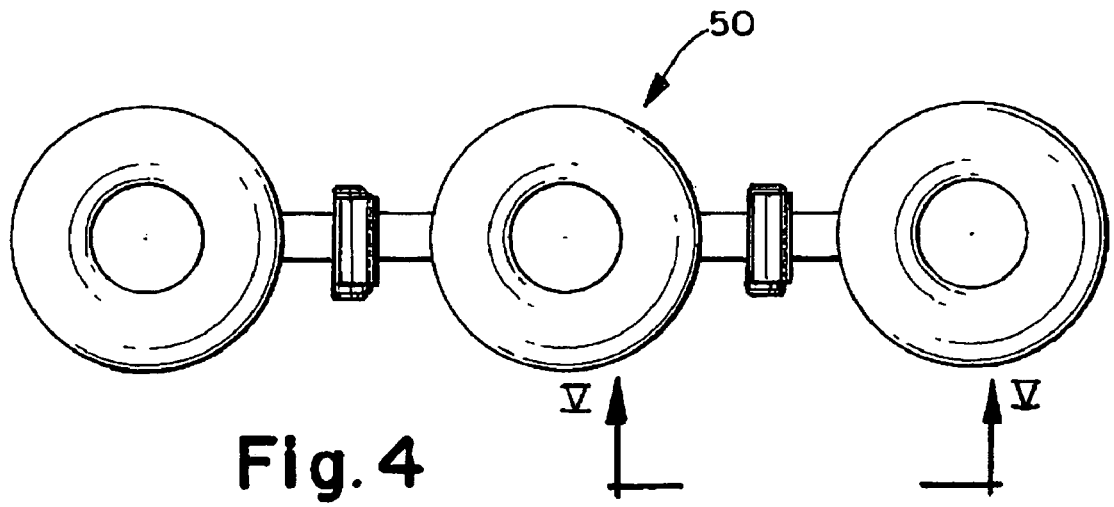
FIG. 4 shows another view of the embodiment of FIG. 3.

FIG. 4 shows an embodiment appropriate for cooking more than one doughnut at a time, e.g., as might be the case when using conventional commercial doughnut cooking machinery. Conventional commercial doughnut cooking machinery is usually comprised of one or more racks linked on a belt. The dough is placed on the racks, which then travel through a deep fryer for some length of time. The dough may be flipped during cooking, so that both sides are cooked more or less equally.

Figure 5:
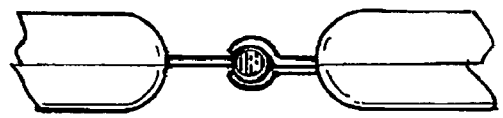
FIG. 5 shows another view, taken along line V-V of the embodiment of FIG. 4.

In FIG. 4, a series of shells, shown generally at 50, are linked. In especially preferred embodiments, this linking is flexible, so as to allow for various roll, pitch, expansion, etc. movements that may occur during the transportation process on the afore mentioned racks. For example, the links may be through a C-shaped mechanism, as shown in FIG. 5, a view taken though line V-V of FIG. 4.

Preferred embodiments are constructed so that they may be linked permanently or temporarily as desired, that is, any number of shells may be linked, for example so as to be contained within a first rack width and then a second rack width, to control production volume, etc. Linking may be as shown in a one dimensional direction, or in a two or three dimensional arrangement or otherwise as desired. Of course, the shells do not have to be linked at all, and may be used singly.

The substance of the shells in the preferred embodiment is relatively high conductivity material, e.g., copper, aluminum, etc. It may be desired to, depending upon use as further described below, use other metals or substances as well, in a temporary or permanent arrangement. For example, a temporary shell may be constructed through the use of tempura batter. This thin batter forms a shield when exposed to oil, preventing penetration into the underlying dough that might otherwise occur. The batter could then be broken off or eaten as well as the underlying product, and so flavorings, etc., might be desired. Other examples of shell construction include, but are not limited to paper, coated paper, plastic, aluminum foil, etc. For example, by wrapping the dough in foil prior to cooking, a high conductivity shell is placed around the dough. Again, the shell could be removed and discarded as desired.

Materials used to construct the shell must be able withstand the relatively high temperatures used in frying. Usually those temperatures are from 250 degrees Fahrenheit to 375 degrees Fahrenheit, with a concentration in the 325 to 375 degrees Fahrenheit range. The actual temperatures used vary according to a number of variables, e.g., the type of food, immersion (used herein as described the process of either full submerging of the shell in oil, e.g. deep frying, as well as partial submerging, e.g. pan frying,) oil used, etc. Some variation in the actual temperature used may occur as a result of the placing of the shell in the oil. For this and other reasons, the actual cooking process with various embodiments may use temperatures that are other than the temperatures traditionally used in frying.

Shells may also be selectively constructed, for example, so as to provide some desired level of exposure to the oil while cooking. For example, selective placement of vents, holes, channels, etc. will provide directed exposure to the oil so as to modify possible taste or other desirable attributes. Additionally, vents, holes, channels, etc. may be used to provide escape for air, water vapor or other substances.

A layered construction or some other attribute may be desired as well. For example, a layered shell may be double walled, and may be hollow or have various substances interposed therein. Of course, coatings may be used for various purposes, e.g. Teflon or similar coatings, tin to reduce reactivity, etc.

As yet other examples, temperature probes and/or other devices may be associated with the shell. For example, a pop-up probe may be used to judge the temperature within the shell, a probe may monitor and broadcast moisture content, etc.

Shells may also be constructed with one or more attributes, for example so as to modify dough properties. For example, shells may be constructed with one or more internal coatings or other substances making direct contact with the dough. An example of this would be the addition of an amount of oil in the shell. Thus the dough may come into contact with a controlled amount of oil while cooking, providing certain attributes to the dough, such as browning, taste, etc. For example, the use of flavorings or other substances may be desired.

It should be noted that, since embodiments may be cooked in various manners, such as through preheating, etc. as is further described below, shells may be constructed as well to facilitate that use. So, for example, cast iron, although generally a poor conductor, is an excellent heat retention material.

So a preheated embodiment, with or without dough, may preferably be made of cast iron so as to provide the retained heat when cooking.

By use of preferred embodiments therefore simple retrofitting is made possible of existing commercial machinery. Additionally, prepackaging of shell plus dough may be desired. For example, embodiments in a disposable shell, e.g. paper, coated paper, plastic, aluminum foil, etc, may be prepackaged, frozen, and, when desired removed and placed in a fryer.

The shells of the preferred embodiments are constructed as to control the fat content provided by the frying process. Thus they are made of materials that would otherwise absorb fat using traditional frying methods.

Contact by the shell with the dough may be modified as desired. For example, a form fitting shell may be used with dough so that a substantial amount of heat is directly conducted to the dough through the shell from the oil. As another example, the shell may be constructed so as to conduct varying amounts of heat through less than full contact with the dough. As yet another example, shells may be so constructed so as to introduce some amount of convection as well.

Shells may additionally be provided in a desired shape, so as to provide a desired shape to the final cooked product. For example, a shell may be filled by a dough extruder or other device, while open. The shape of the shell provides shape to the doughnut, so separate cutting is not necessary. Of course, access may be provided to a closed shell in other embodiments, and an extruder or other device may introduce dough through the port prior to cooking. The access may be subsequently closed or left open, e.g., for limited access by the oil to the product, to shape the product, etc. as desired.

As was noted above, various embodiments may include foods as desired, for example, dough-based products, such as doughnuts, with holes and without holes, dough balls, fritters, filled doughnuts, éclairs, sponge cakes, etc. Other examples include other foods traditionally fried.

Preferred embodiments may be used in various ways, in addition to cooking through conduction via frying. So for example, air, oil, etc. convection may occur while cooking through appropriate channels or other modifications. Embodiments may also be provided, if desired, to expand with the dough. For example, the dough may be used in such a way as to expand prior to cooking via frying, (e.g. through the use of leavening, proofing, etc.) and it may be desired to have the embodiment provide conductive heat to substantially the entire dough during that process.

Certain preferred embodiments use low carbohydrate dough in a cooking process. The following recipe is of one such embodiment (quantities are for small servings, others may be used of course):

| Ingredients |
| --- |
| 5 eggs |
| 1 cup Splenda® |
| 1 cup melted butter |
| ¼ cup vanilla extract |
| 2 cups sifted almond flour |
| 1 flat Tablespoon Rumford® Baking Powder |

Directions

Beat eggs with whisk. Beat in Splenda® Beat in melted butter. Mix in Vanilla Extract. Any other desired flavorings, additional items, (e.g. poppy seeds) may be mixed in as well.

In a separate bowl, mix almond flour with baking powder. Mix and knead both mixtures together. Allow to rest 2-3 minutes.

Place less than one half volume of shell in shell. Place shell in deep fryer for 2 minutes.

The resultant product is a low fat, low carbohydrate doughnut. Other doughs or foods of course may be used.

Preferred embodiments comprising low carbohydrate dough may also be made using an admixture of konjac glucomannan. Konjac glucomannan is used herein to refer to the substance also known as konjac flour. Konjac glucomannan is a soluble dietary fiber with similarities to pectin in structure and function. Konjac glucomannan is obtained, by methods known in the art, e.g. grinding, milling, etc. from the tubers of various Amorphophallus species and is primarily comprised of a hydrocolloidal polysaccharide, known as glucomannan.

Embodiments of the present invention subsequently process konjac glucomannan through mechanical and/or chemical (including enzymatic methods) in order to decrease the "gumminess" traditionally associated with konjac glucomannan. That gumminess, caused by long chain associations of the glucomannan fibers, may have made the use of konjac glucomannan less than appealing. For example, the traditional gumminess has led to increased chewing in order to ingest konjac glucomannan foods.

A preferred method of decreasing the gumminess traditionally associated with konjac glucomannan is to add an animal based protein concentrate (such as fish protein concentrate or flours made from eggs, pork rinds, pork, beef, chicken, turkey, etc). In the especially preferred embodiments, glucomannan is mixed with the animal based protein concentrate in a varying ratio by volume, at an extremely low blending rate until a relatively homogenous mixture is provided. The ratio varies depending upon the predetermined desired texture or desired other properties (e.g., water volume, etc.,) so for example, a ratio may be 10:1 glucomannan to protein for a first predetermined texture and 5:1 glucomannan to protein for a second predetermined texture.

When heated, at temperatures above 100 degrees Celsius, the interaction between konjac glucomannan and protein leads to a less gummy material that can be used in various foods. The functional-like characteristics of konjac glucomannan, including its mechanical characteristics as noted above, also provide benefits to the user.

Non- or minimally-nutritive sweeteners and/or salt may be added as desired before or while heating. Other additives may be combined with the product of the example as well. For example, stabilizers as known in the art, e.g., pectin, locust bean gum, xanthan gum, etc. may be added in a ratio of up to 1.0%; 0% to 1.0% citric acid or malic acid as known in the art may be added in order to adjust the pH; preservatives as known in the art, e.g. 0.1% potassium sorbate, may be added as well; bulking agents as known in the art, e.g., cellulose, maltodextrin, polydextrose, etc. may be added as well, anti-caking agents as known in the art may be added, etc.

In certain preferred embodiments, yeast may not be used in the dough, as yeast, in the fermentation process, requires carbohydrates. Accordingly, mechanical and/or chemical methods are used to introduce gas into the dough for leavening.

Mechanical methods include pressurization of the dough. In especially preferred embodiments, the dough is placed in a pressure chamber. The dough is then pressurized with the degree of pressurization dependant upon ambient pressure and humidity, but in any event with pressurization sufficient to have gas bubbles infuse the dough. Upon depressurization, removal from the chamber, and heating, the gas bubbles introduced into the dough via pressurization expand as the dough is heated, thus creating desired pockets in the bread.

In other embodiments, high speed whipping of the dough rather than, or in addition to, pressurization, may be utilized in order to create gas pockets prior to baking.

Chemical methods include the use of baking soda and/or baking powder. Their use in various embodiments may be according to the quantities and guidelines provided in conventional baking. Alternatively, unleavened products may be made as well.

Post cooking treatment may be desired as well, of course, e.g., glazing, filling, further heat treatment, incorporation with other products, etc.

Although the word dough has been used above with regard to its usual meaning, it should be noted that variations may be used as well. So, for example, an anhydrous paste may be used, in powdered form, as a slurry, etc. Various types of doughs may be mixed as well, (e.g., low carbohydrate selectively mixed with higher carbohydrate doughs)

Although the present invention has been described with respect to various specific embodiments, various modifications will be apparent from the present disclosure and are intended to be within the scope of the following claims.

We claim:

1. A method of cooking comprising:
providing a shell including a first plate having a groove therein and at least one edge and a second plate having a groove therein and at least one edge, said first plate and said second plate being hingeably connected along an edge thereof, the shell forming at least one first configuration wherein food to be cooked may be placed therein and forming a second configuration wherein said first plate and said second plate are brought together to enclose said food to be cooked;
configuring the shell in a first configuration;
placing food to be cooked within the shell;
placing said shell in a second configuration by bringing together said first plate and said second plate to form an enclosure comprising a first environment which is a food containing environment, the first environment which is a food containing environment being formed in part by the groove of said first plate and in part by the groove of said second plate, the step of placing said shell in a second configuration including bringing together said first plate and said second plate so that the first plate groove and the second plate groove define a space within which the food placed in said shell may be cooked;
placing said shell containing the food desired to be cooked in a frying apparatus, said frying apparatus comprising a second environment, said second environment containing liquid cooking media, wherein placing said shell in said frying apparatus comprises placing said shell on a transport rack and transporting said shell through said liquid cooking media;
maintaining said shell in said frying apparatus for a sufficient period of time to cook said food and maintaining the food to be cooked in said first environment and maintaining said cooking media in said second environment thereby preventing direct contact between said food and said cooking media;
removing the cooked food from the shell, wherein the cooked food resembles the shape of the shell in which it was placed relative to the second configuration of the shell,
wherein removing said cooked food from said shell includes lifting one of said first shell plate and said second shell plate relative to the other.

2. A method of cooking as in claim 1 whereby the temperature utilized in said frying apparatus is the range of 250 to 400 degrees Fahrenheit.

3. A method of cooking as in claim 1 whereby the temperature utilized in said frying apparatus is the range of 325 to 375 degrees Fahrenheit.

4. A method of cooking as in claim 1 further comprising:
providing a shape to said food.

5. A method of cooking as in claim 1 wherein said food is dough.

6. A method of cooking as in claim 1 wherein said food is dough and further comprises:
konjac glucomannan and
animal based protein concentrate, wherein gas bubbles are introduced into said dough using mechanical and/or chemical methods.

7. A method of cooking as in claim 6 wherein said mechanical methods consist of pressurization of said dough.

8. A method of cooking as in claim 6 wherein said mechanical methods comprise high speed whipping of said dough.

9. A method of cooking as in claim 6 wherein said chemical methods comprise baking soda and/or baking powder.

10. A method of cooking comprising:
providing a shell including a first plate with at least one edge and a second plate with at least one edge, said first plate and said second plate being hingeably connected along an edge thereof, the shell forming at least one first configuration wherein food to be cooked may be placed therein and forming a second configuration wherein said first plate and said second plate are configured so they may be swingably brought together to enclose said food to be cooked and form the second configuration;
configuring the shell in a first configuration;
placing food to be cooked within the shell;
placing said shell in a second configuration by bringing together said first plate and said second plate; and
immersing said shell in a frying apparatus containing liquid cooking media, wherein immersing said shell in said frying apparatus comprises placing said shell on a transport rack and transporting said shell through said liquid cooking media wherein said food does not contact said liquid cooking media;
removing the cooked food from the shell, wherein the cooked food resembles the shape of the shell in which it was placed relative to the second configuration of the shell,
wherein removing said cooked food from said shell includes lifting one of said first shell plate and said second shell plate relative to the other, wherein said first shell plate and said second shell plate remain connected to one another during said lifting.

11. A method of cooking as in claim 10 wherein said immersion period is for a sufficient period of time to cook said food.

12. A method of cooking as in claim 10 further comprising conductive heating of said food, while said shell is immersed in said frying apparatus.

13. A method of cooking comprising:
providing at least two shells, each shell including a first plate with at least one edge and a second plate with at least one edge, said first plate and said second plate being hingeably connected along an edge thereof, the shell forming at least one first configuration wherein food to be cooked may be placed therein and forming a second configuration wherein said first plate and said second plate are brought together to enclose said food to be cooked;

configuring the shells in a first configuration;

placing food to be cooked within the shells;

placing each of said shells in a second configuration by bringing together said first and said second plate;

the method including linking the shells together with a flexible linking mechanism;

immersing the linked shells that contain the food to be cooked in a frying apparatus and cooking said food contained within said linked shells wherein said food does not contact a liquid cooking media within the frying apparatus;

removing the cooked food from the shells, wherein the cooked food resembles the second shell configuration of the shell from which it was removed, wherein removing said cooked food from a said shell includes lifting one of said first shell plate and said second shell plate relative to the other, wherein said first shell plate and said second shell plate remain connected to one another during said lifting.

14. A method of cooking as in claim 13 wherein each said shell is in two or more parts, which are combined prior to placing said shell in a frying apparatus, and wherein the cooked food of one shell is independently removable from said one shell relative to each other cooked food item in the other shell.

15. The method of claim 13, including providing a first linkage on at least one said first shell, and providing a second linkage on at least one second shell, wherein said first and second linkages are linkable to each other to provide a flexible linkage; wherein linking the shells together includes linking said first shell and said second shell together by linking said first linkage with said second linkage to form a flexible connection between said first shell and said second shell.

16. The method of claim 15 wherein at least one of said first linkage and said second linkage is a c-shaped linkage, and wherein at least the other of said first linkage and said second linkage is a pin linkage; and wherein linking includes connecting together said c-shaped linkage and said pin linkage.

17. A method of cooking comprising:

providing a shell including a first plate with at least one edge and second plate with at least one edge, said first plate and said second plate being hingeably connected along an edge thereof, the shell having at least one groove therein forming at least one first configuration wherein dough may be placed therein and forming a second configuration wherein said first plate and said second plate are brought together to enclose said dough;

extruding dough from an apparatus to a groove of said shell;

placing said shell within a frying apparatus containing a liquid cooking media, wherein placing said shell within said frying apparatus comprises placing said shell on a transport rack and transporting said shell through said liquid cooking media; and, cooking said dough within said frying apparatus wherein said food does not contact said liquid cooking media;

removing the shell from the frying apparatus;

removing the cooked food from the shell that resembles the shell second configuration of said shell into which said dough was extruded, wherein removing said cooked food from said shell includes lifting one of said first shell plate and said second shell plate relative to the other, wherein said first shell plate and said second shell plate remain connected to one another during said lifting.

18. A method of cooking comprising:

providing a shell including:

(i) a first plate with at least one outer edge and at least one inner edge, and having at least one groove therein, and (ii) a second plate with at least one outer edge and at least one inner edge, and having at least one groove therein, said first plate and said second plate being hingeably connected along an outer edge thereof, the shell forming at least one first configuration wherein said first plate is separated from said second plate a distance sufficient to expose said first plate grove wherein food to be cooked may be placed, and forming a second configuration wherein said first plate and said second plate are brought together to enclose said food to be cooked so that said first plate outer edge engages with said second plate outer edge and said first plate inner edge engages with said second plate inner edge;

configuring the shell in a first configuration that provides access to at least one of said first plate groove and said second plate groove;

placing food to be cooked within the shell comprising placing said food within one of said first plate groove and said second plate groove;

placing said shell in a second configuration by bringing together said first plate and said second plate to form an enclosure comprising a first environment which is a food containing environment;

placing said shell containing the food desired to be cooked in a frying apparatus said frying apparatus comprising a second environment, said second environment containing a liquid cooking media, wherein placing said shell within said frying apparatus comprises placing said shell on a transport rack and transporting said shell through said liquid cooking media;

maintaining said shell in said frying apparatus for a sufficient period of time to cook said food and maintaining the food to be cooked in said first environment and maintaining said liquid cooking media in said second environment thereby preventing direct contact between said food and said cooking media;

removing the cooked food from the shell, wherein said cooked food resembles the configuration of the grooves of said first and second plates;

wherein removing said cooked food from said shell includes lifting said first shell plate from said second shell plate, wherein said first shell plate and said second shell plate remain connected to one another during said lifting.

19. The method of claim 18, wherein said first plate inner edge is radially inward of said first plate outer edge, and wherein said second plate inner edge is radially inward of said second outer edge.

20. The method of claim 18, including providing a plurality of shells, linking said plurality of shells together with a flexible linking mechanism, and wherein the linked together shells are placed within said frying apparatus by placing said linked together shells on the transport rack and transporting said linked together shells through said liquid cooking media.

21. A method of cooking comprising:

providing at least two shells, each shell including a first plate with at least one edge and a second plate with at least one edge, said first plate and said second plate being hingeably connected along an edge thereof, the shell forming at least one first configuration wherein food to be cooked may be placed therein and forming a second configuration wherein said first plate and said second plate are brought together to enclose said food to be cooked;

configuring the shells in a first configuration;

placing food to be cooked within the shells;

placing each of said shells in a second configuration by bringing together said first and said second plate;

the method including linking the shells together with a flexible linking mechanism;

immersing the linked shells that contain the food to be cooked in a frying apparatus and cooking said food contained within said linked shells, wherein immersing said shells in said frying apparatus comprises placing said shells on a transport rack and transporting said shells through said liquid cooking media wherein said food does not contact said cooking media;

removing the cooked food from the shells, wherein the cooked food resembles the second shell configuration of the shell from which it was removed, wherein removing said cooked food from a said shell includes lifting one of said first shell plate and said second shell plate relative to the other.

* * * * *